United States Patent [19]

Takanashi

[11] Patent Number: 4,836,630

[45] Date of Patent: Jun. 6, 1989

[54] OPTICAL SCANNING SYSTEM HAVING A SURFACE INCLINATION CORRECTION FUNCTION

[75] Inventor: Kenichi Takanashi, Yokohama, Japan

[73] Assignee: Ricoh Company, Ltd., Tokyo, Japan

[21] Appl. No.: 111,257

[22] Filed: Oct. 22, 1987

[30] Foreign Application Priority Data

Oct. 23, 1986 [JP] Japan .................. 61-250722

[51] Int. Cl.$^4$ .............................................. G02B 26/10
[52] U.S. Cl. ........................................ 350/6.1; 350/6.8
[58] Field of Search ........................... 350/6.1, 6.5–6.8, 350/434; 250/235

[56] References Cited

U.S. PATENT DOCUMENTS

| | | | |
|---|---|---|---|
| 4,401,362 | 8/1983 | Maeda | 350/6.8 |
| 4,674,825 | 6/1987 | Tateoka et al. | 350/6.8 |
| 4,707,085 | 11/1987 | Takanashi et al. | 350/6.8 |
| 4,712,884 | 12/1987 | Sakuma et al. | 350/434 |
| 4,720,632 | 1/1988 | Kaheko | 350/6.8 |
| 4,756,584 | 7/1988 | Takanashi | 350/6.8 |

Primary Examiner—John K. Corbin
Assistant Examiner—Loha Ben
Attorney, Agent, or Firm—Oblon, Fisher, Spivak, McClelland & Maier

[57] ABSTRACT

An optical scanning surface includes a light source, a first imaging forming optical system for forming a line image from a light flux emitted from the light source, a rotating polyogon mirror for deflecting the light from the light source through the first image forming optical system over a predetermined angle, a second image forming optical system for receiving the thus deflected light flux and then forming an image on a scanning surface. The second image forming optical system includes a first single spherical meniscus lens having a negative refracting power, a second single spherical meniscus lens having a positive refracting power, and a third single lens having a cylindrical surface facing the second lens and a toric surface at its opposite side, as arranged in the order mentioned between the polygon mirror and the scanning surface.

5 Claims, 8 Drawing Sheets

OPTICAL SCANNING SYSTEM HAVING A SURFACE INCLINATION CORRECTION FUNCTION

BACKGROUND OF THE INVENTION

1. Field of the Invention

This invention generally relates to an optical scanning system having a surface inclination correction function, and, in particular, to such an optical scanning system capable of correcting a curvature of field within a plane in the main scanning direction excellently.

2. Description of the Prior Art

Heretofore, in an optical beam scanning system using a deflection reflecting surface, such as a rotating polygon mirror, there have been proposed various optical systems, in which, even if the direction of advancement of a light beam which has been deflected for scanning changes within a plane perpendicular to a plane formed by rotation of a line normal to the deflection reflecting surface, it does not appear as irregularities in pitch of a scanning line in a scanning surface which is typically a photosensitive surface. In such an optical system, an anamorphic optical system is disposed between the deflection reflecting surface and the scanning surface such that a light flux is focused on the scanning line within a first plane including the main optical axis of the optical system and the scanning line (i.e., main scanning direction) and a conjugate relationship in terms of geometrical optics is established between the deflection reflecting surface and the scanning surface in a second plane (i.e., auxiliary scanning direction) perpendicular to the first plane.

Among optical systems of this type, for example, in the optical system disclosed in Japanese Patent Laid-open Pub. No. 50-93720, use is made of a cylindrical lens as such an anamorphic optical system; however, such a cylindrical lens must be disposed at a location close to the scanning surface so as to obtain an image of excellent quality. However, with such a close arrangement, if the recording width increases, a cylindrical lens of larger width is required, which tends to push up the cost. Japanese Patent Laid-open Pub. No. 60-100118 proposes to use a lens having a toric surface so as to avoid the above-described problem. According to the teachings of this publication, the curvature of field in the main scanning direction is corrected excellently; however, no sufficient consideration has been given to the elimination of pitch irregularities in the scanning line.

SUMMARY OF THE INVENTION

In accordance with the principle of the present invention, an optical scanning system includes a deflector for deflecting a light beam over a predetermined angle and an optical image forming system disposed between the deflector and a scanning surface. The optical image forming system includes a single spherical meniscus lens having a negative refracting power, a single spherical meniscus lens having a positive refracting power, and a single lens having a cylindrical surface, which has a negative refracting power in the auxiliary scanning direction, at the deflector side and a toric surface, which has different positive refracting powers in the main and auxiliary scanning directions, at the scanning surface side. The optical image forming system is compact in structure and is capable of correcting an inclination of a deflection reflecting surface of the deflector. Besides, with the present optical image forming system, the beam scanning speed is constant on the scanning surface, and the size of a beam spot formed on the scanning surface is small both in the main and auxiliary scanning directions.

It is therefore a primary object of the present invention to obviate the disadvantages of the prior art as described above and to provide an improved optical scanning system.

Another object of the present invention is to provide an improved optical scanning system having a surface inclination correction function.

A further object of the present invention is to provide an improved optical scanning system capable of correcting the curvature of field within a plane in the main scanning direction excellently.

Other objects, advantages and novel features of the present invention will become apparent from the following detailed description of the invention when considered in conjunction with the accompanying drawings.

DESCRIPTION OF THE PREFERRED EMBODIMENTS

Figure 1:
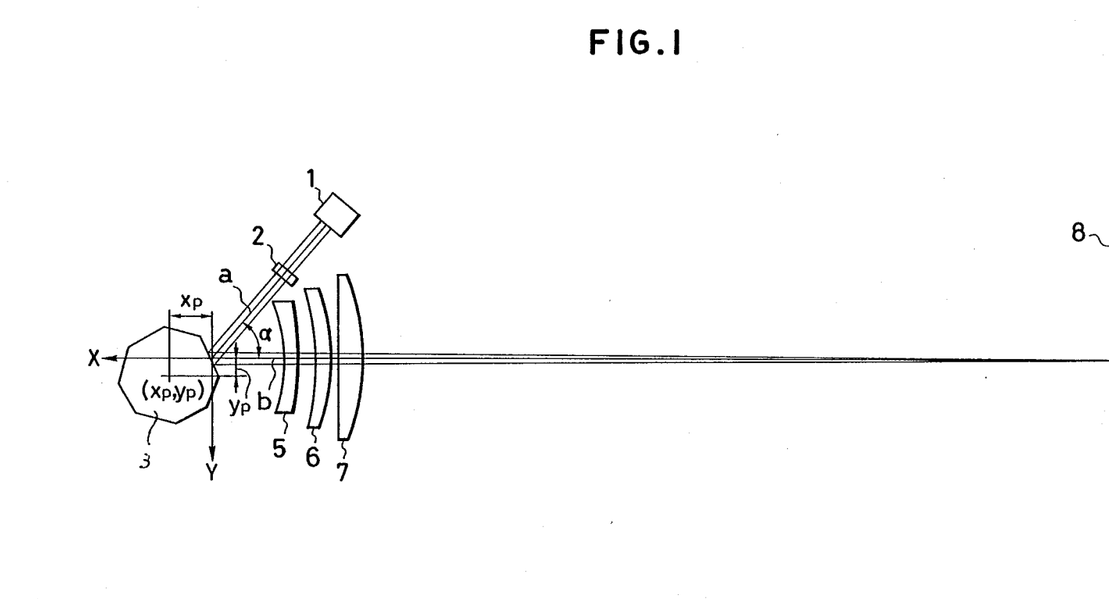
FIG. 1 is a schematic illustration showing in a plan view taken at a plane in the main scanning direction an optical scanning system construed in accordance with one embodiment of the present invention.

Referring now to FIG. 1, an optical scanning system constructed in accordance with one embodiment of the present invention includes a light source unit 1, a first image forming optical system 2 for forming an image in the form of a line from a light flux received from the light source unit 1, a deflector 3 having at least one deflection reflecting surface in the vicinity of a location where the line image is formed, and a second image forming optical system, which includes optical components 5 through 7, for forming an image on a scanning surface 8 from the light flux deflected by the deflector 3. The second image forming optical system includes a single spherical meniscus lens 5 having a negative refracting power, a single spherical meniscus lens 6 having a positive refracting power, and a single lens 7 having a cylindrical surface, which has a negative refracting power in the direction perpendicular to the deflection surface, at the deflector side and a toric surface, which has different positive refracting powers in the direction of the deflection surface and the direction perpendicular thereto, at the scanning surface side.

The angle formed between a center light ray a of the light flux emitted from the light source unit 1 and an optical axis b of the second image forming optical system is denoted by alpha. In an orthogonal coordinate system having the point of origin at the intersection between the center light ray a and the optical axis b and having an X axis defined by the optical axis b, the coordinate of the center of rotation of the deflector 3 is defined as $x_p$ and $y_p$. In addition, the angle formed between the center light ray of the light beam deflected by the rotation of the deflector 3 and the optical axis b of the second image forming optical system is denoted by $\theta$. The deflector 3 is a rotating polygon mirror having N number of facets, and the inradius, i.e., the radius of a circle inscribable in the polygon mirror, is denoted by R. With the designation of the above-described parameters, the following conditions are satisfied in accordance with the principle of the present invention.

$$\theta < \alpha < \frac{4\pi}{N} - \theta \quad (1)$$

$$0 \leq x_p \leq R \cdot \cos\frac{\alpha}{2} \quad (2)$$

$$0 \leq y_p \leq R \cdot \sin\frac{\alpha}{2} \quad (3)$$

In addition, by designating the lateral magnification of the second image forming optical system in the auxiliary scanning direction by $\beta$ and the resultant focal distance in the main scanning direction by $f_M$, then the following conditions must be satisfied in accordance with the principle of the present invention.

$$-4.7 < \beta < -2.7 \quad (4)$$

$$-34.2 < \beta \cdot \frac{f_M}{R} < -9.3 \quad (5)$$

Figure 10:
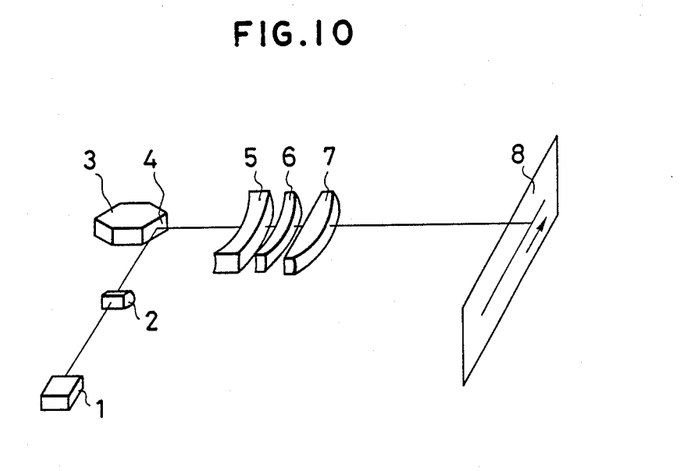
FIG. 10 is a schematic illustration showing in perspective the structure of a typical optical scanning system.
Figure 11:
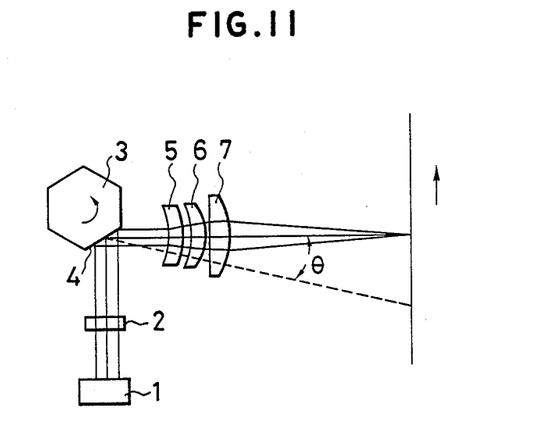
FIG 11 is a schematic illustration showing in plan view taken at a plane in the main scanning direction the structure shown in FIG. 10.
Figure 12:
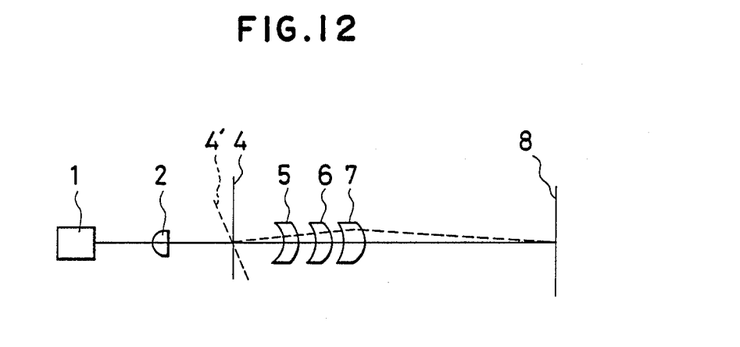
FIG. 12 is a schematic illustration showing in elevational view taken at a plane in the auxiliary scanning direction the structure shown in FIG. 10.

With reference to FIGS. 10 through 12, an optical scanning system typically includes a light source unit 1 comprised, for example, of a light source or a combination of a light source and a condenser, a line image forming optical system 2 for forming a line image in a plane of the main scanning direction from a light flux emitted from the light source unit 1, a deflector 3 having at least one deflection reflecting surface 4 in the vicinity where the line image is formed, a negative meniscus lens 5, a positive meniscus lens 6 and a lens 7 having a toric surface. As shown in FIG. 10, the lenses 5 through 7 are arranged in the order mentioned between the deflector 3 and a scanning surface 8. With this structure, a beam spot is formed on the scanning surface 8 and the beam spot is moved on the scanning surface 8 along a hypothetical scanning line along with the rotation of the deflector 3.

In the case of the optical scanning system of FIG. 10, in a plane of the auxiliary scanning direction, as shown in FIG. 12, the light flux emitted from the light source unit 1 is focused to define a line image in the vicinity of the reflecting surface 4 of the deflector 3 by means of the line image forming optical system 2. And, the resultant refracting power of a combination of the lenses 5 through 7 in this plane differs from the refracting power in a plane of the main scanning direction shown in FIG. 11, and it is so structured that a conjugate relationship in terms of geometrical optics is established between the deflection reflecting surface 4 and the scanning surface 8. For this reason, due, for example, to manufacturing tolerances or any other causes, even if the reflecting surface 4 becomes inclined as indicated by 4' with respect to the direction perpendicular to the main scanning plane during the rotation of the deflector 3, the light flux passing through the lenses 5 through 7 changes as indicated by the dotted line; however, the position of the beam spot formed on the scanning surface 8 remains substantially unchanged.

Figure 13:
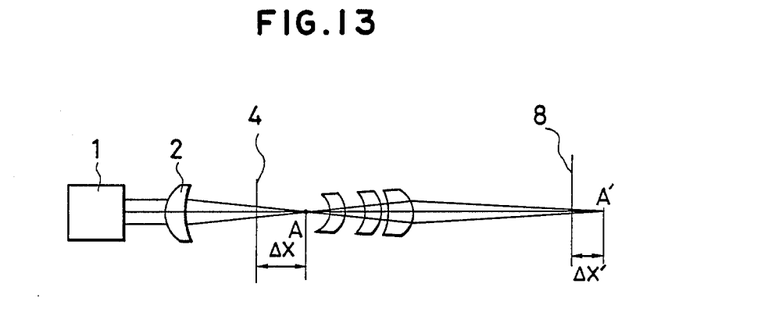
FIG. 13 is a schematic illustration which is useful for explaining the problem associated with the optical scanning system shown in FIG. 10.

However, in such an optical scanning system, in the case where the deflector 3 is a rotating polygon mirror, the axis of rotation is generally not located at the reflecting surface 4. Accordingly, as shown in FIG. 13, the location A where the line image is formed is generally not on the reflecting surface 4, and its amount of discrepancy delta X varies as the deflector 3 rotates. In this case, a conjugate image of the line image at location A is formed at location A' which is shifted in position from the scanning surface 8 over a distance delta X'. Now, designating the image forming lateral magnification in the conjugate relationship in the auxiliary scanning direction between the deflector 3 and the scanning surface 8 through the lenses 5 through 7 by beta, this shift amount delta X' may be expressed by the following equation.

delta X' = (beta)·(delta X)

Figure 14:
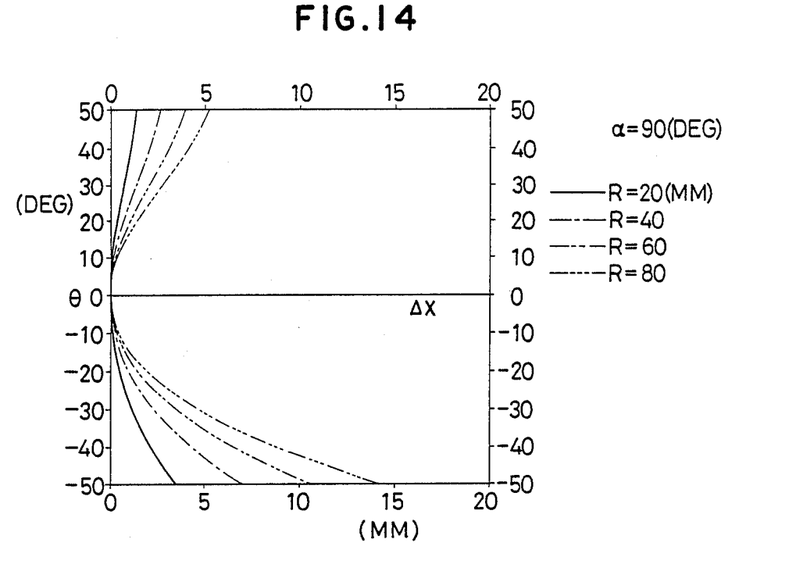
FIGS. 14 and 15 are graphs illustrating the curvature of field characteristics by the deflector.
Figure 15:
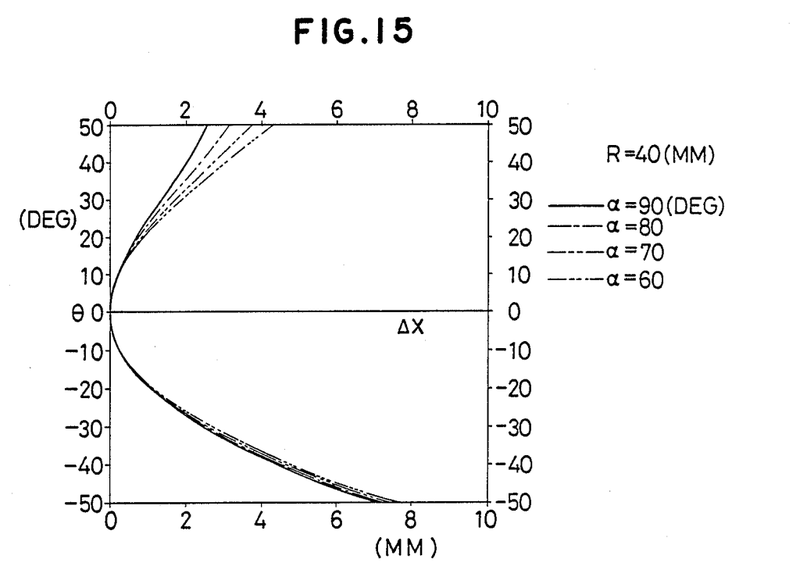

The angle formed between the center light ray of the light beam deflected by the rotation of the deflector 3 and the optical axis defined by the lenses 5 through 7 in the main scanning plane is denoted by $\theta$, and the relationship between $\theta$ and the above-described delta X is graphically shown in FIG. 14. In the graph of FIG. 14, the parameter R indicates the inradius of the polygon mirror 3, i.e., the radius of a circle inscribable in the polygon mirror 3. As shown in FIG. 11, the center light ray of the light flux incident upon the deflector 3 is perpendicular to the optical axis defined by the lenses 5 through 7; however, the amount of shift delta X also varies when the angle alpha within the main scanning plane varies. With the inradius R of the polygon mirror 3 held constant, FIG. 15 graphically shows how the relationship between $\theta$ and delta X varies with changes in the angle alpha.

For example, as in the case of a galvanomirror, in the case where the center of rotation coincides with a reflecting surface, such changes in delta X do not occur. However, in a common rotating polygon mirror, changes in delta X occur, and, at the same time, the position of a line image also changes in the direction perpendicular thereto. For this reason, the line image moves two dimensionally along with the rotation of the polygon mirror, and, in addition, generally asymmetrically with respect to the lens optical axis. Such shift in position of a beam spot corresponds to the curvature of field of an optical scanning system, and it is necessary to correct such curvature of field both in the main scanning direction and in the auxiliary scanning direction effectively over the entire effective scanning region on the scanning surface. Of course, in the main scanning direction, the uniformity in scanning speed of a light beam must also be corrected suitably.

Regarding the embodiment of the present optical scanning system shown in FIG. 1, the lower limit of the above-described condition (1) is required for the center light ray a to be located outside of the effective deflection region of the second image forming optical system having the fθ characteristic, and its upper limit is required for the light flux incident upon the scanning surface 8 to be scattered, whereby a ghost image formed on the scanning surface 8 by the light flux reflected by the deflector 3 for the second time is to be located outside of the effective scanning region of the scanning surface 8. In addition, the above-described conditions (2) and (3) are determined such that variations in the distance between the line image and the reflecting surface shown in FIGS. 14 and 15 remain as small as possible. On the other hand, the above-described conditions (4) and (5) are the conditions to minimize the size of an image both in the main and auxiliary scanning directions in the case when use is made of a rotating polygon mirror as the deflector, and, also, to form the image in the vicinity of the scanning surface in both directions. If the lower limit of each of these two conditions is exceeded, the image width in the auxiliary scanning direction is increased, so that fluctuations in the beam size on the scanning surface are increased. In addition, if the upper limits are exceeded, the image width remains small, but the size of the lens diameter and also of the rotating polygon mirror increases, so that there arises various problems in the processing of the lens, the cost of the lens, the processing of the polygon mirror, and the cost and load of a rotational driving system.

Now, specific examples of the scanning optics suitable for use in the present optical scanning system will be described in detail below. It is to be noted that the following nomenclature will be used in the tables shown below.

- $r_1 - r_6$: radii (in mm) of curvature of the three lenses in the main scanning direction;
- $r_1' - r_6'$: radii (in mm) of curvature of the three lenses in the auxiliary scanning direction;
- $d_0$: air spacing (in mm) on the optical axis between the rotating polygon mirror and the surface having radius of curvature $r_1$;
- $d_1, d_3, d_5$: thickness (in mm) of the respective lenses on the axis;
- $d_2, d_4$: air spacing (in mm) on the optical axis between the first and second lenses, and between the second and third lenses, respectively;
- $n_1, n_2, n_3$: refractive index of the three lenses (for wavelength of 780 nm);
- R: inradius of the rotating polygon mirror;
- alpha: angle formed between the center light ray of a light flux incident upon the rotating polygon mirror and the optical axis;
- $f_M$: resultant focal distance (in mm) of the three lenses in the main scanning direction;
- $f_S$: resultant focal distance (in mm) of the three lenses in the auxiliary scanning direction; and
- θ: deflection angle.

EXAMPLE 1

| | r | r' | d | $n_1$ |
|---|---|---|---|---|
| 0 | | | 13.24 | |
| 1 | −20.755 | −20.755 | 2.27 | 1.51118 |
| 2 | −192.913 | −192.913 | 2.01 | |
| 3 | −70.366 | −70.366 | 4.16 | 1.51118 |
| 4 | −27.986 | −27.986 | 0.83 | |
| 5 | infinite | −53.233 | 5.3 | 1.76605 |
| 6 | −49.507 | −13.014 | | | alpha = 60°; 2θ = 64.8°; beta = −4.513
$f_M = 100$; $R/f_M = 0.132$; beta/$(R/f_M) = -34.19$

EXAMPLE 2

| | r | r' | d | $n_1$ |
|---|---|---|---|---|
| 0 | | | 13.24 | |
| 1 | −20.755 | −20.755 | 2.27 | 1.51118 |
| 2 | −192.913 | −192.913 | 2.01 | |
| 3 | −70.366 | −70.366 | 4.16 | 1.51118 |
| 4 | −27.986 | −27.986 | 0.83 | |
| 5 | infinite | −119.292 | 5.3 | 1.76605 |
| 6 | −49.507 | −14.452 | | | alpha = 60°; 2θ = 64.8°; beta = −4.606
$f_M = 100$; $R/f_M = 0.303$; beta/$(R/f_M) = 15.201$

EXAMPLE 3

| | r | r' | d | $n_1$ |
|---|---|---|---|---|
| 0 | | | 19.29 | |
| 1 | −20.755 | −20.755 | 2.27 | 1.51118 |
| 2 | −192.913 | −192.913 | 2.01 | |
| 3 | −70.366 | −70.366 | 4.16 | 1.51118 |
| 4 | −27.986 | −27.986 | 0.83 | |
| 5 | infinite | −85.877 | 5.3 | 1.76605 |
| 6 | −49.507 | −15.965 | | | alpha = 60°; 2θ = 64.8°; beta = −3.576
$f_M = 100$; $R/f_M = 0.132$; beta/$(R/f_M) = -27.091$

EXAMPLE 4

Figure 2A:
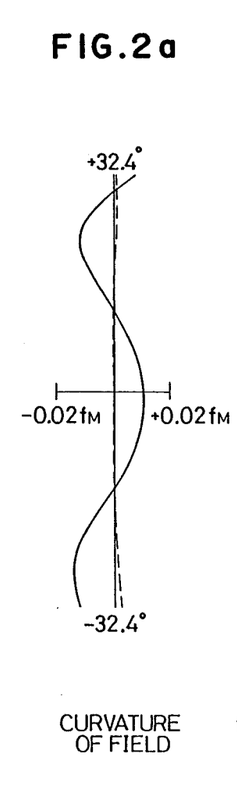
FIGS. 2 through 9 are graphs showing optical characteristics of several specific examples of the present optical scanning system.
Figure 2B:
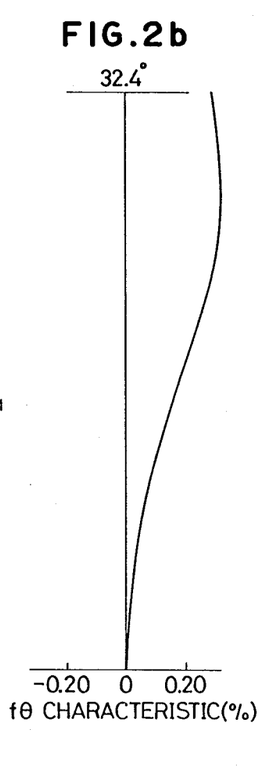

| | r | r' | d | $n_1$ |
|---|---|---|---|---|
| 0 | | | 23.84 | |
| 1 | −21.653 | −21.653 | 2.27 | 1.51118 |
| 2 | −181.845 | −181.845 | 2.01 | |
| 3 | −88.977 | −88.977 | 6.81 | 1.51118 |
| 4 | −28.974 | −28.974 | 0.83 | |
| 5 | infinite | −153.688 | 9.08 | 1.76605 |
| 6 | −59.957 | −21.564 | | | alpha = 60°; 2θ = 64.8°; beta = −2.835
$f_M = 100$; $R/f_M = 0.303$; beta/$(R/f_M) = -9.356$ FIGS. 2 and 3 graphically show aberration characteristics of Example 1. FIG. 2a shows the curvature of field characteristic when the rotating polygon mirror is in rotation, in which the dotted line indicates an image formed in the main scanning direction and the solid line indicates an image formed in the auxiliary scanning direction. This curvature of field characteristic indicates non-symmetry due to fluctuations in the incident light flux caused by the deflector, and it represents the entire scanning region. FIG. 2b shows the fθ characteristic which indicates constancy in the scanning speed of the light beam. Designating the height of an ideal image by $f \times \theta$ and the height of a real image by h′, then the fθ characteristic can be expressed by the following equation.

$$f\theta \text{ characteristic} = \frac{h' - f \times \theta}{f \times \theta} \times 100 (\%)$$

Figure 3A:
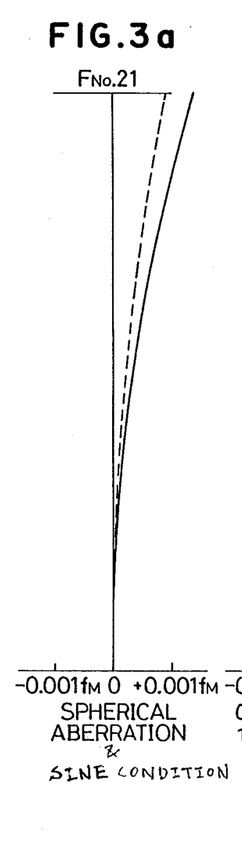
Figure 3B:
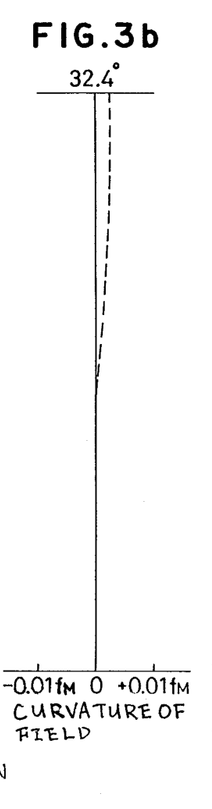
Figure 4A:
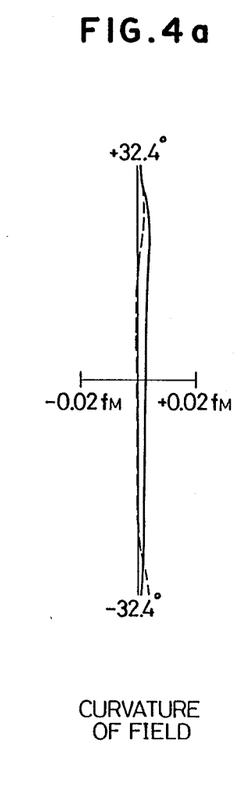
Figure 4B:
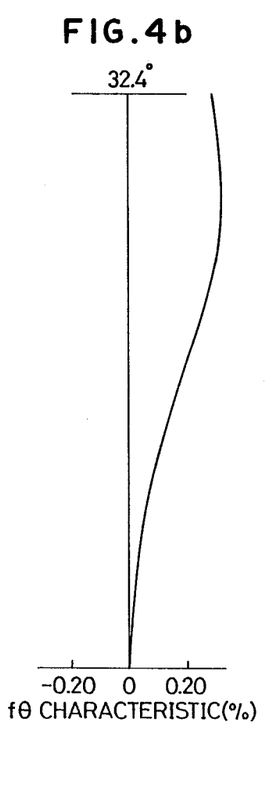
Figure 5A:
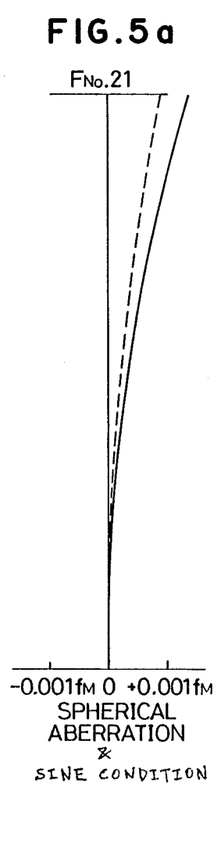
Figure 5B:
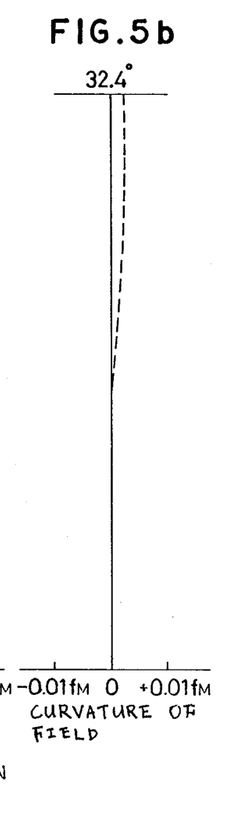
Figure 6A:
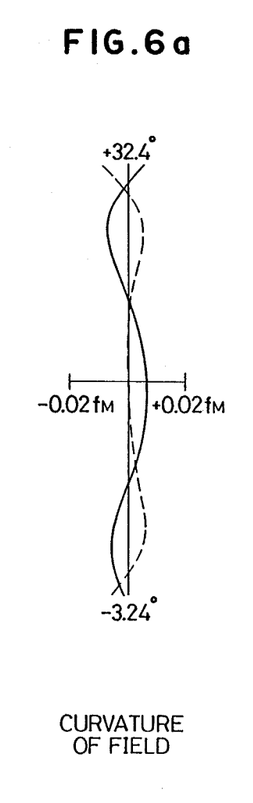
Figure 6B:
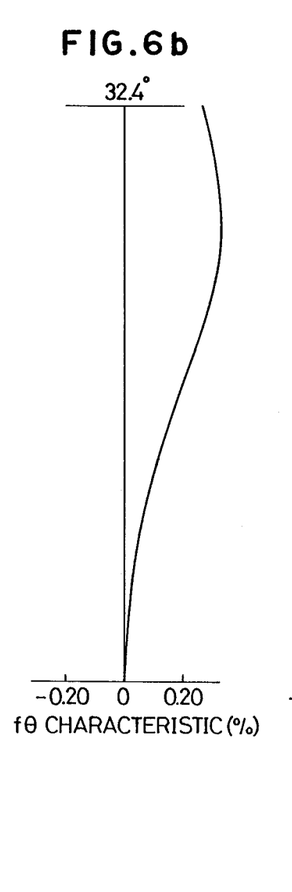
Figure 7A:
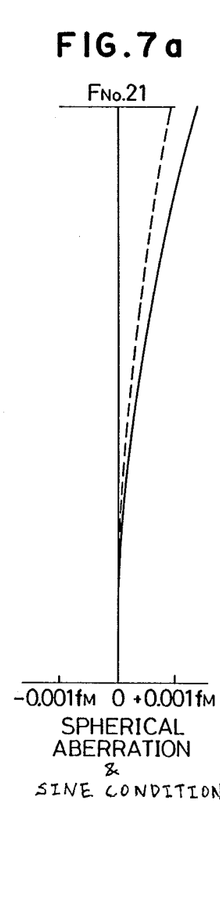
Figure 7B:
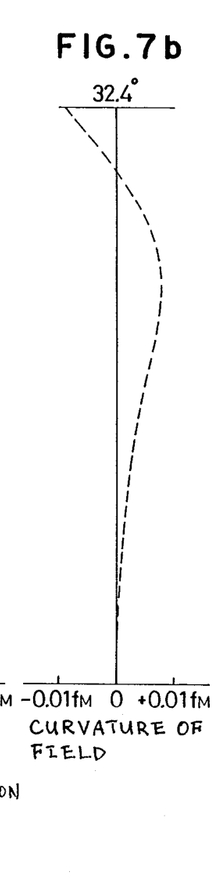
Figure 8A:
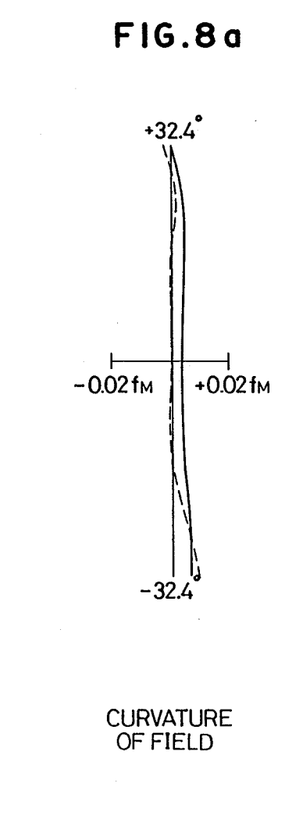
Figure 8B:
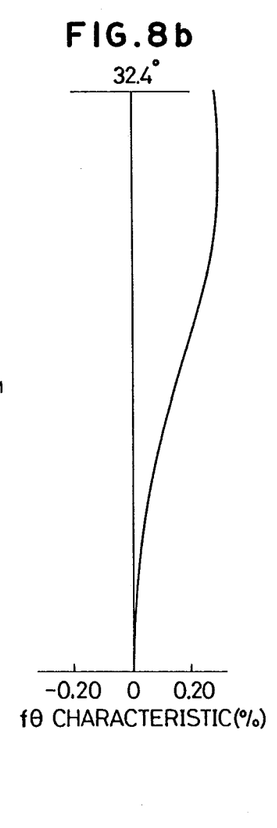
Figure 9A:
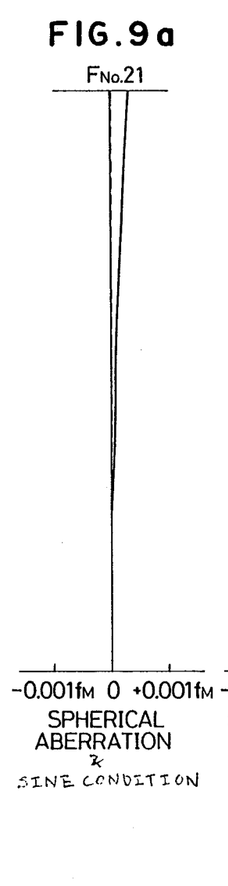
Figure 9B:
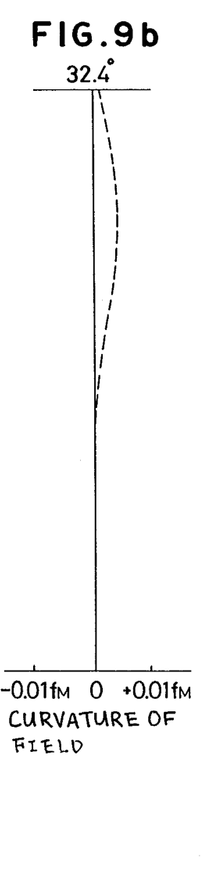

FIGS. 3 shows the characteristics after elimination of fluctuations by the deflector. FIG. 3a shows the spherical aberration characteristic by the solid line and the sine condition characteristic by the dotted line. FIG. 3b shows the curvature of field characteristic in the main scanning direction. Similarly, FIGS. 4 and 5, 6 and 7, and 8 and 9 show the similar aberration characteristics of Examples 2, 3 and 4, respectively.

As described above, in accordance with the present invention, fluctuations due to the rotation of a polygon mirror are taken into account and the amount of curvature is minimized to thereby allow to minimize fluctuations in the diameter of a beam spot, which, in turn, allows to obtain a high density laser recording system. And, the image forming optical system of the present optical scanning system includes only two non-spherical surfaces, i.e., one toric surface and one cylindrical surface, with the rest being all spherical surfaces. And, the size of the present image forming optical system is smaller in size as compared with the case of using an elongated cylindrical lens. Thus, the present optical scanning system may be made much smaller in size, low at cost and yet high in performance.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical scanning system, comprising:
   a light source for emitting a light flux;
   first image forming means for forming a first image at a predetermined location from the light flux emitted from said light source;
   a rotating polygon mirror having at least one reflecting surface in the vicinity of said first image, said reflecting surface reflecting said light flux from said light source, thereby causing said light flux to be deflected over a predetermined angle; and
   second image forming means for forming a second image on a scanning surface from said light source deflected by said rotating polygon mirror, said second image forming means defining a conjugate relationship in terms of geometrical optics between said reflecting surface and said scanning surface, said second image forming means including a first single spherical meniscus lens having a negative refracting power, a second single spherical meniscus lens having a positive refracting power, and a third single lens having a cylindrical surface facing said second lens and a toric surface at its opposite surface, said first, second and third lenses being arranged in the order mentioned between said rotating polygon mirror and said scanning surface;
   whereby, designating a lateral magnification of said conjugate relationship by $\beta$, an inradius of said rotating polygon mirror by R, and a focal distance of said second image forming means by $f_M$, the following conditions are satisfied:

$$-4.7 < \beta < -2.7; \text{ and} \quad (1)$$

$$-34.2 < \beta \cdot \frac{f_M}{R} < -9.3. \quad (2)$$

2. The optical scanning system of claim 1, wherein said first image is formed in the form of a line.

3. The optical scanning system of claim 2, wherein said rotating polygon mirror includes a plurality of said reflecting surfaces arranged circumferentially around an axis of rotation thereof.

4. The optical scanning system of claim 2, wherein said conjugate relationship is established in a first plane which includes an optical axis of said second image forming means and which is perpendicular to a second plane defined by said light flux and the light deflected by said rotating polygon mirror.

5. The optical scanning system of claim 4, wherein said cylindrical surface has a negative refracting power in said first plane and said toric surface has different positive refracting powers in said first and second planes.

* * * * *